No. 853,771. PATENTED MAY 14, 1907.
J. F. COTTRELL.
LUBRICATOR FOR TROLLEY WHEELS.
APPLICATION FILED DEC. 20, 1905.

Witnesses
Frank B. Hoffman
H. Schmidt

Inventor
James F. Cottrell
By Victor J. Evans
Attorney

UNITED STATES PATENT OFFICE.

JAMES F. COTTRELL, OF ROCHESTER, NEW YORK.

LUBRICATOR FOR TROLLEY-WHEELS.

No. 853,771.     Specification of Letters Patent.     Patented May 14, 1907.

Application filed December 20, 1905. Serial No. 292,646.

*To all whom it may concern:*

Be it known that I, JAMES F. COTTRELL, a citizen of the United States, residing at Rochester, in the county of Monroe and State of New York, have invented new and useful Improvements in Lubricators for Trolley-Wheels, of which the following is a specification.

This invention relates to trolley wheels and especially to the means for lubricating the bearing thereof so that the wheel will be maintained in effective working condition for a considerable period of time without necessitating daily attention on the part of a mechanic, the trolley wheel being what may be termed self-lubricating.

With the above general object in view, the invention consists in the novel construction, combination and arrangement hereinafter fully described, illustrated and claimed.

Figure 1:
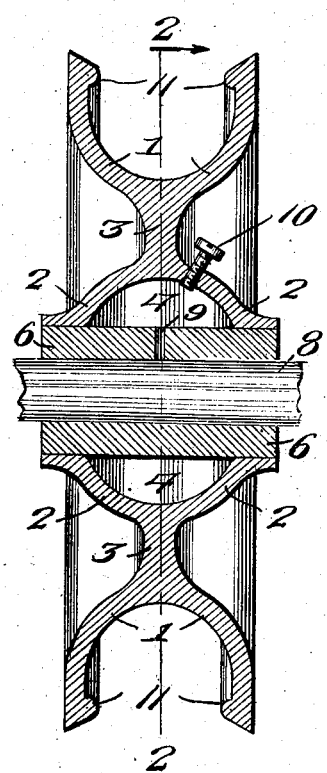
Figure 2:
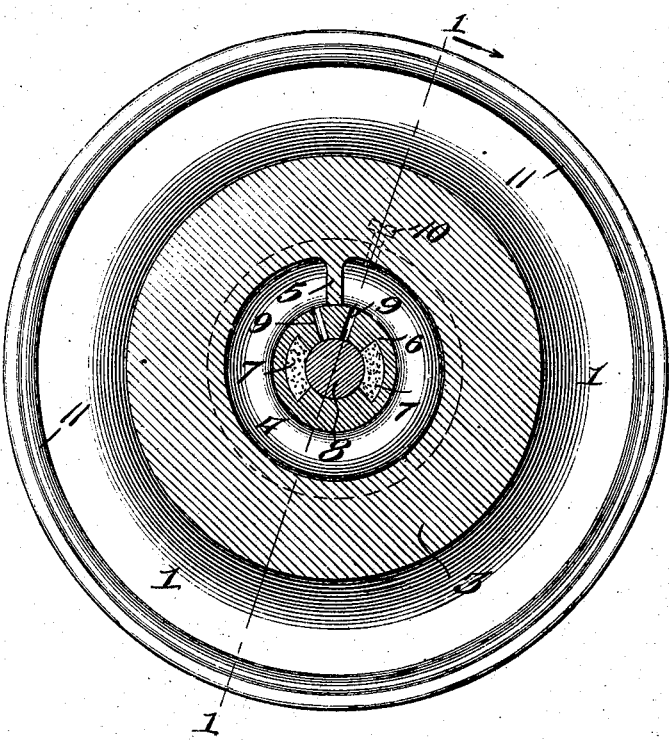

In the accompanying drawings, Figure 1 is a diametrical section through a trolley wheel embodying the present invention. Fig. 2 is a central longitudinal section through the same.

Like reference numerals designate corresponding parts in both figures of the drawings.

In the drawings I have shown a familiar form of trolley wheel embodying the cross sectionally concavo-convex rim 1, the hub 2 and the connecting web or body 3.

In carrying out the present invention the hub 2 is interiorly channeled or chambered to form an oil chamber 4 which extends nearly but not quite all the way around the circle of the hub, the continuity of the oil chamber being broken by an interrupting baffle wall or stop 5.

A bushing 6 is driven tightly into the bore of the hub and fits tightly within the hub at both ends of the latter and also bears against the inner edge of the baffle wall or stop 5 as clearly shown in Fig. 2 so that the lubricant contained in the chamber 4 is prevented from flowing past the stop wall 5.

The inner surface of the bushing 6 is provided with a plurality of cross sectionally segmental pockets 7 which are filled with graphite with which the shaft or journal 8 of the wheel rides in contact and by means of which said shaft or journal is lubricated. Any desired shape may be given to the graphite containing pockets 7 but by preference they extend only part way around the inner surface of the bushing. Oil holes 9 extend through the solid portion of the bushing as shown in Fig. 2 and said holes open out into the chamber 4 on opposite sides of the stop wall 5 and adjacent thereto so that in the rapid rotation of the trolley wheel, the body of oil contained in the chamber 4 will be arrested by the wall 5 and directed through one or the other of the holes 9 against the axle or the journal 8 which thus distributes the oil over the surface of the graphite and enables the oil to act in conjunction with the graphite to lubricate the axle or journal.

A filling plug 10 is screwed into and through the wall of the chamber 4 to allow the lubricant to be introduced therein. The rim 1 is also provided with internal beads 11 adjacent to the extreme edge portion thereof which act to retain the trolley wheel in engagement with the conductor and also avoid arcing to a considerable extent.

Having thus described the invention, what I claim is:

The herein described trolley wheel provided with an integral hollow hub having openings at opposite ends thereof, a cylindrical bushing inserted endwise through and fitted tightly within said hub to close the opposite ends thereof and form an oil chamber within the hub, said bushing having interior segmental pockets filled with graphite to bear against the shaft, there being a stop wall extending entirely across the oil chamber and formed integral with the hub, said wall extending lengthwise of the hub and forming an imperforate interrupting closure wall for said oil chamber, and said wall bearing against the bushing, and the latter being provided with oil ports located one at each side of and adjacent to said stop wall.

In testimony whereof, I affix my signature in presence of two witnesses.

JAMES F. COTTRELL.

Witnesses:
    CHARLES J. TUCKER,
    JOHN A. BYRAM.